Jan. 15, 1952 W. E. HIGGINBOTTOM 2,582,381
METHOD AND MEANS FOR OPENING BAGS
Filed Aug. 8, 1945 8 Sheets-Sheet 1

Inventor
William E. Higginbottom,
By Ross O'Murrey
Attorney

Jan. 15, 1952     W. E. HIGGINBOTTOM     2,582,381
METHOD AND MEANS FOR OPENING BAGS
Filed Aug. 8, 1945     8 Sheets-Sheet 2

Inventor
William E. Higginbottom,
By Ross C. Hurrey
Attorney

Jan. 15, 1952     W. E. HIGGINBOTTOM     2,582,381
METHOD AND MEANS FOR OPENING BAGS
Filed Aug. 8, 1945                         8 Sheets-Sheet 5

Fig. 7

Inventor
William E. Higginbottom,
By Ross W. Furrey
Attorney

Jan. 15, 1952     W. E. HIGGINBOTTOM     2,582,381
METHOD AND MEANS FOR OPENING BAGS Filed Aug. 8, 1945     8 Sheets-Sheet 8

Inventor
William E. Higginbottom,
By Ross C. Hurry
Attorney

Patented Jan. 15, 1952

2,582,381

UNITED STATES PATENT OFFICE 2,582,381

METHOD AND MEANS FOR OPENING BAGS

William E. Higginbottom, Newark, N. J., assignor to Benjamin C. Betner Company, Devon, Pa., a corporation of Delaware Application August 8, 1945, Serial No. 609,621

7 Claims. (Cl. 53—8)

It is an object of this invention to provide apparatus for withdrawing consecutive bags from a magazine, opening the same, and inserting them into consecutively presented cartons.

It is a further object of this invention to provide an improved means for opening fully the bottoms and bodies of bags which have been closed by a single transverse bottom seam.

It is a further object of this invention to provide an improved method of opening square type, gusseted bags from flattened condition which method insures the complete and positive formation of a rectangular bottom in a plane at right angles to the axis of the bag body.

The above and other objects will be made clear from the following detailed description taken in connection with the annexed drawings in which.

The packaging of many commodities requires the use of a substantially rigid carton and at the same time requires that the package possess a high degree of resistance to the penetration of greases, oils, water, and moisture vapor. The carton, being formed of board of substantial caliper is notoriously difficult to render impervious, particularly in the region of the closure flaps. For this reason, it has long been the practice to supply such cartons with an impervious liner usually formed of relatively thin sheet material. To form such liners inside the carton is an expensive and complicated job requiring equally expensive and complicated machinery. It is infinitely cheaper and more efficient to provide liners in the form of prefabricated bags which can be produced at a cost per thousand far less than the equivalent cost of forming a liner within the carton.

The cheapest bag types are known in the trade as "flats" and "squares". The flat bag comprises a flattened tube having only front and rear walls, the tube being closed or bottomed either by heat sealing together the interiorly facing margins of one end of the tube, or by turning one end of the tube against one wall of the bag and sealing it thereto, or by a combination of such means. The square bag is precisely similar except that it has gusseted side walls intermediate the front and rear walls. In either case, the bags are manufactured, packed and shipped in bundles in individually flattened condition.

When a flat bag has its body expanded to rectangular configuration, the bottom closure seam is greater in length than either dimension of the expanded body. This occasions the formation of triangular "ears" which connect the opposite walls of the rectangular body with the extremities of the bottom closure seam. When a square bag is expanded to a rectangular configuration, the rectangular dimensions of the expanded bag body are determined by the width of the front and rear walls and by the width of the gusseted side walls. External ears of the type encountered in flat bags are not formed, because the bottom closure seam has a length precisely equal to the width of the front and rear walls. Equivalents of such ears are formed, however, on the interior of the bag and serve to join the apices of the gusseted folds from where the same are caught in the bottom seam to the edges of the side walls adjacent the plane of the bag bottom.

The proper creasing and flattening of the ears is one of the major points of difficulty in the proper opening of either flat or square bags. This problem is somewhat less severe in the case of a flat bag, since, generally speaking, it does not matter whether the externally formed ears are accurately creased simultaneously with the expansion of the bag body. Normally, upon expansion of the bag body, these external ears will nevertheless extend substantially in the plane of the bag bottom, and, being external, they are readily accessible for folding either against their respective side walls or against the bag bottom. In a square bag, however, these triangular ears are internal and require accurate creasing if the bottom itself is to be accurately formed. There is no option as to the disposal of such ears which must always lie in the plane of the bag bottom superimposed upon those portions of the front and rear walls making up the bottom.

The machine disclosed herein will operate successfully upon either flat or square bags. It was designed, however, particularly to meet certain problems peculiar to the square bag and the action of the machine will be described with reference to the handling of such bags.

Figure 1:
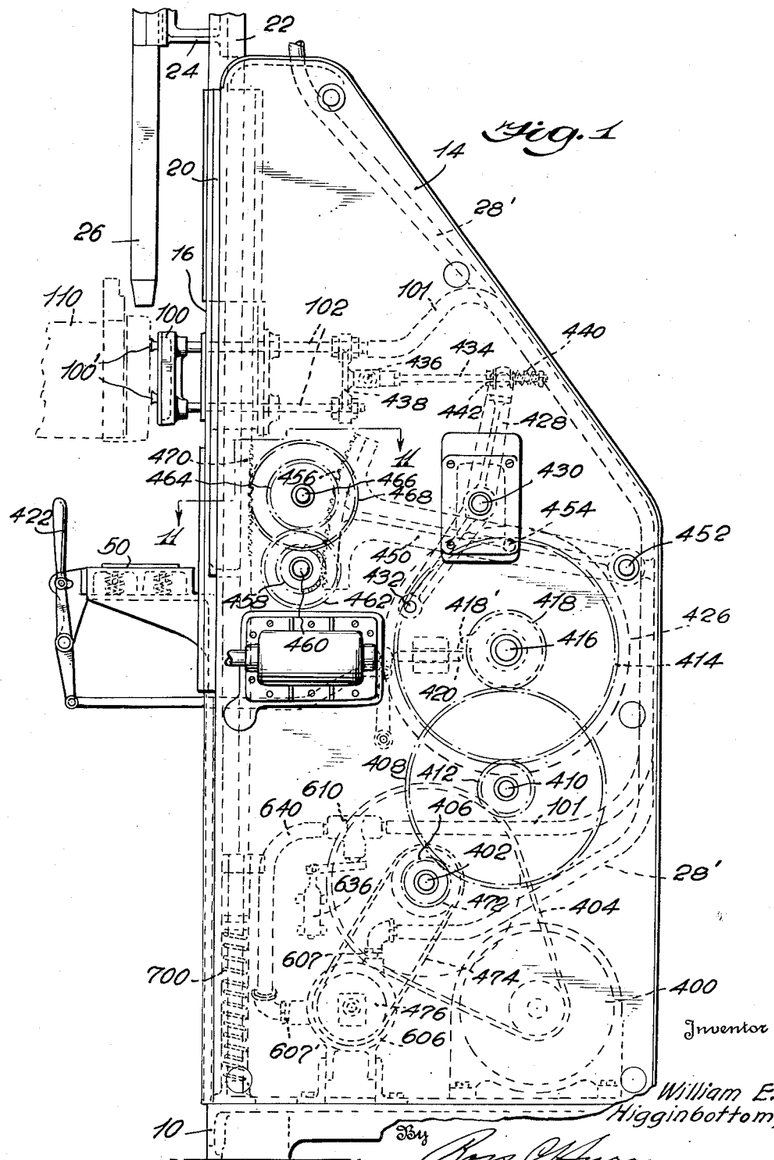
Figure 1 is a side elevation of the machine with certain details of the conveyor omitted.
Figures 2, 12, 13:
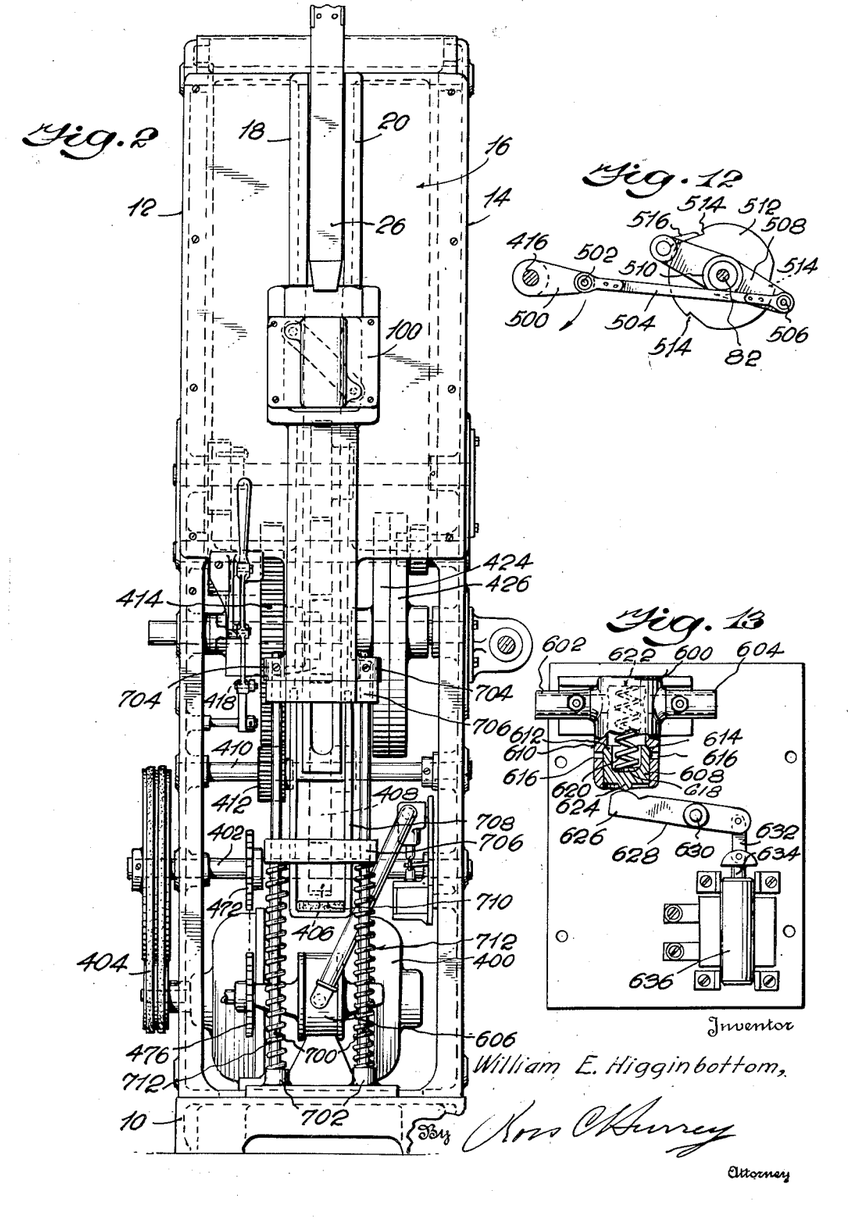
Fig. 2 is a front elevation.
Fig. 12 is a detail of a portion of the conveyor drive.
Fig. 13 is a detail of the relay and valve for controlling the vacuum system.

Referring now to Figs. 1 and 2, the machine is composed of a base 10 to which is secured a casting comprising side walls 12 and 14 and a front wall 16. At the upper end of front wall 16 there are formed guides 18 and 20 which define a passageway having a sliding fit with an elevator member 22. A bracket 24 (Figs. 8, 9 and 10) connects the elevator member 22 to the plunger 26 by means of a clamp 28.

The plunger 26 and the elevator 22 are reciprocated vertically by means which will presently be described.

Mounted below the extremity 26' of the plunger 26 is a conveyor 50 which has been omitted from Figs. 1 and 2 for the purpose of clarity and is shown in detail in Figs. 3 and 4. This conveyor is intended to advance a series of already opened cartons and to bring each carton to rest momentarily directly in line with the plunger 26. The conveyor comprises a carton supporting slide 52. A pair of chains 54 run at opposite sides of the plate 52 and pass over sprockets 58 at one end of the conveyor and over sprockets 60 at the opposite end. At intervals, the chains 54 are connected by lugs 62, on each of which lugs is mounted a pusher plate 64. The chains 54 are moved intermittently whereby to advance the pusher plates 64 over the slide 52. A pair of guide rails 66 are mounted above the slide 52 and are spaced to provide a smooth sliding fit on one dimension of the cartons to be moved over the conveyor. The pusher plates 64 center on the median line between said rails. A drive sprocket 68 is mounted on the same shaft as the forward conveyor sprockets 58 and derives intermittent motion through a belt 70 from a sprocket 72 secured to a shaft 74 which is mounted in a housing 76 secured to the wall 14 of the main frame. A bevel gear 78 is secured to the shaft 74 and meshes with a bevel gear 80 on a horizontal shaft 82 supported in bearings 84 and 84' in walls 12 and 14, respectively, of the main frame. The specific mechanism for actuating the shaft 82, and thereby the conveyor 50, will be described hereinafter.

The bag-feeding magazine cooperates with a suction head mounted in the main frame to provide not only a supply of bags, but means for withdrawing individual bags and preliminarily opening each bag withdrawn. These parts will best be understood by reference to Figs. 1, 2, 5, 6 and 7. Referring now to Figs. 1 and 2, there is shown a suction head 100 mounted on rods 102 to reciprocate normal to the front wall 16 of the main frame. The rods 102 are spaced to clear the elevator 22 and the head 100 is reciprocated by means presently to be described. The magazine 110 is shown generally in Figs. 5, 6 and 7, and is made up of a pair of angles 114 defining an open bottom channel and which are supported on brackets 116. The brackets 116 are supported on cross members 118 and are adjustable there-along by means of bolts 120 which pass through slots 122 in the cross members 118. Cross members 118 receive support from the floor through conventional frame members 124. Guide plates 128 are secured to angles 114 to define with the horizontal flanges of the brackets 114 a bag containing channel.

Figure 5:
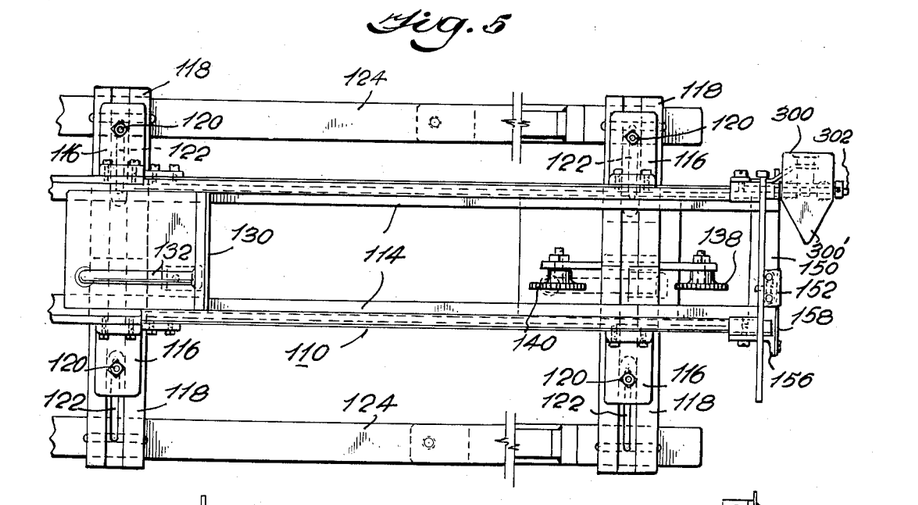
Fig. 5 is a plan view of the bag magazine.
Figure 6:
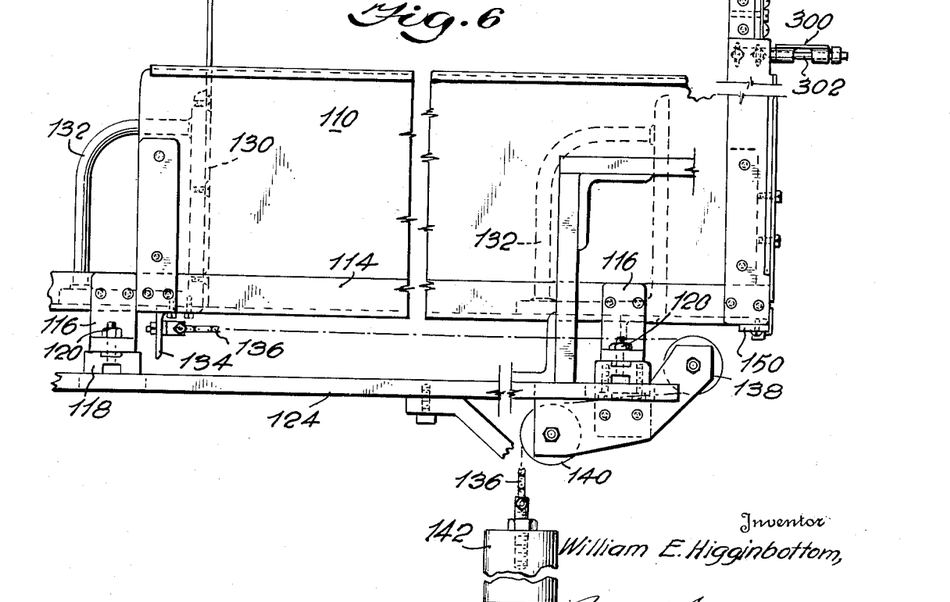
Fig. 6 is a side elevation of the bag magazine.

A pusher member 130 is supported on the horizontal flanges of the brackets 114. A handle member 132 serves to withdraw the pusher member 130 and thus to clear the magazine for the reception of a supply of bags. On the under side of the pusher member 130 is bolted a bracket 134 to which is secured a chain 136 which passes over pulleys 138 and 140 and has at its free end a weight 142. This arrangement serves to supply a constant pressure of the member 130 against a supply of bags in the magazine.

Figure 7:
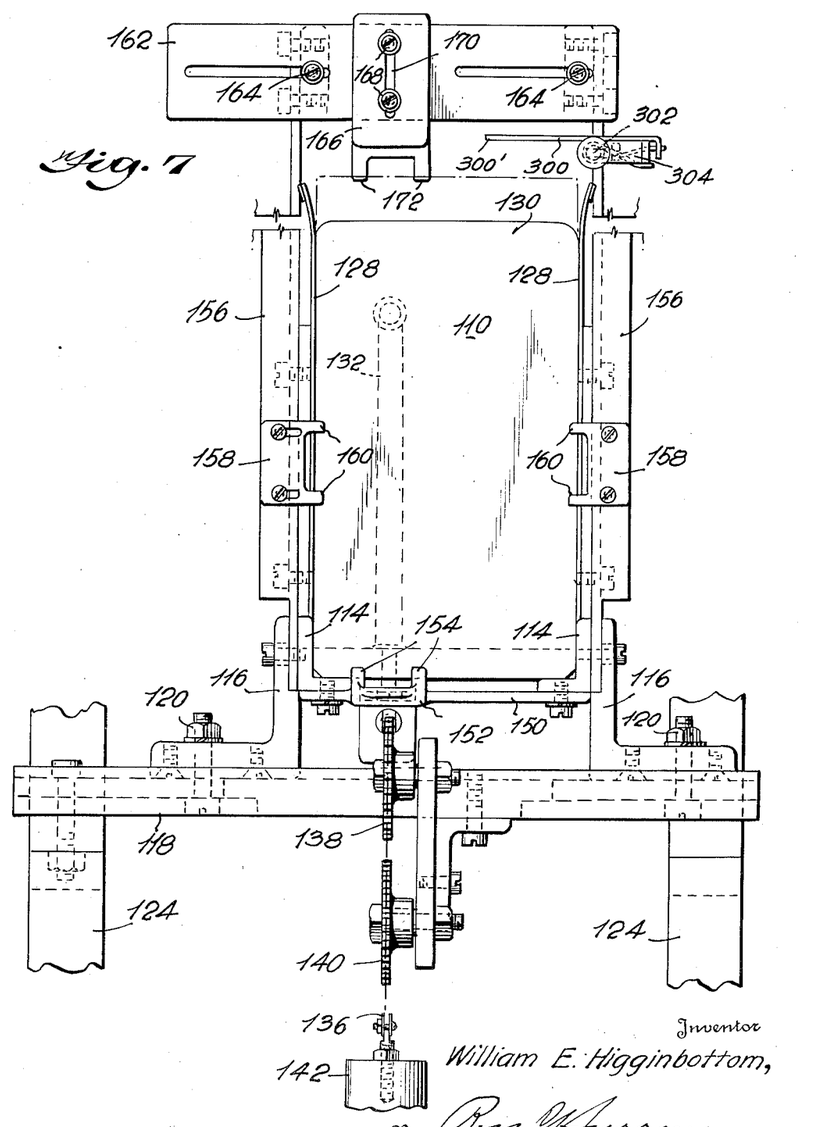
Fig. 7 is a front elevation on enlarged scale of the bag magazine showing particularly, the bag holding and opening fingers.

At the delivery end of the magazine, the angles 114 are connected by a cross bar 150 to which is secured a bracket 152 having upwardly projecting fingers 154 (Fig. 7). These fingers serve to hold the bottom edge of the bags in the magazine against the thrust of the pusher member 130. Also at the delivery end and adjacent to member 150, are mounted two vertical angles 156 to which are adjustably secured plates 158, each of which has a pair of fingers 160 projecting into the path of bags in the magazine and holding the side edges of the bags against the force of pusher plate 130. The angles 156 are joined at their upper ends by a cross piece 162 through screw and slot connections 164 which permit transverse adjustment of member 162. A plate 116 is secured to member 162 by screws 168 passing through slot 170 in the plate 166, thus providing vertical adjustment of the plate 166 relative to the member 162 and consequently relative to the upper ends of the bags in the magazine. Plate 166 terminates in fingers 172 which project into the path of the bags and likewise serve to restrain them against the force of the pusher plate 130.

The several fingers 154, 160 and 172 cooperate with the construction of the bag and with the suction head 100 (Fig. 1) so as to permit bags to be withdrawn from the magazine, one at a time, and partially to open each bag as it is withdrawn and to present its open mouth for the reception of the plunger 26 (Fig. 1).

Figures 14, 15, 16, 17, 21:
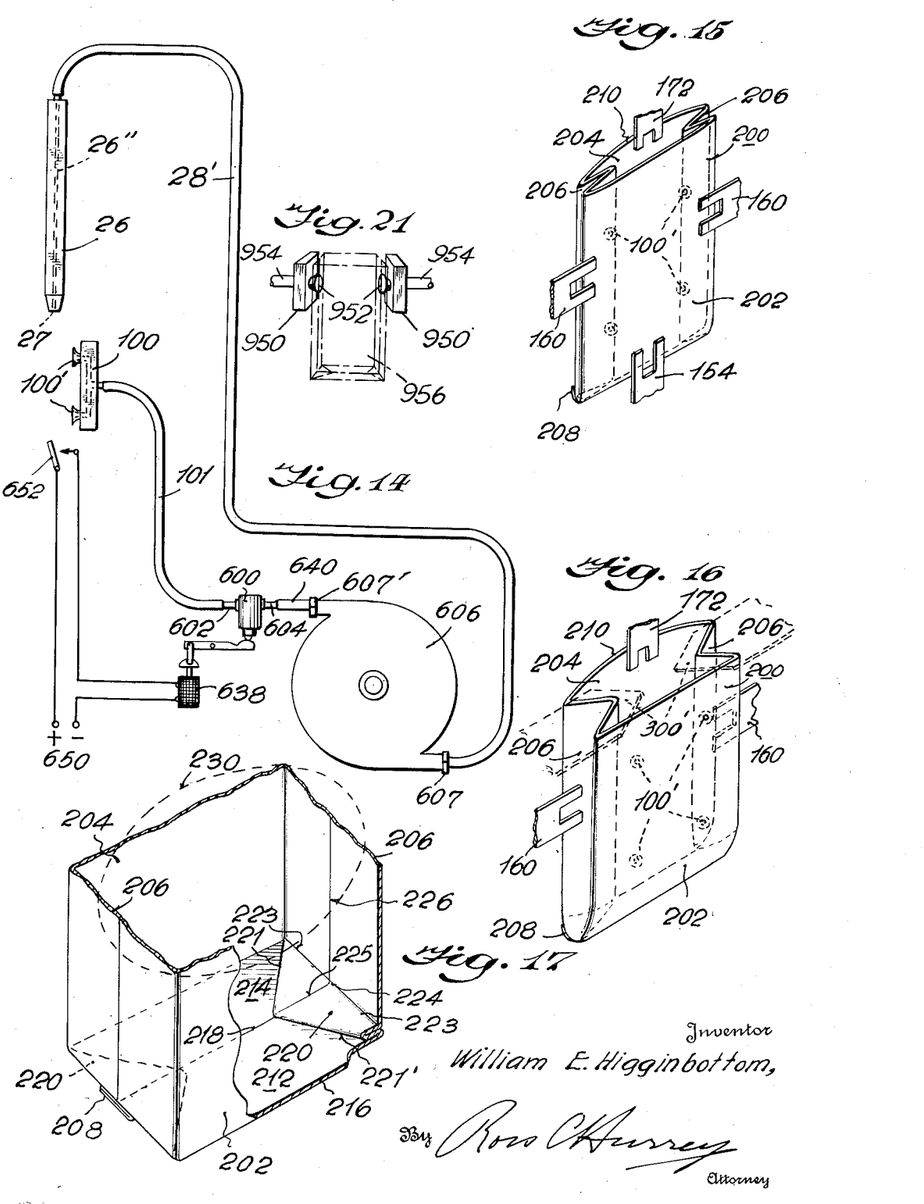
Fig. 14 is a diagram illustrating the electrical and pneumatic circuits of the machine.
Figs. 15 and 16 illustrate successful steps in the withdrawal of a bag from the magazine and its partial opening.
Fig. 17 is a perspective view partially in section illustrating the formation of the bottom folds of a square bag.
Fig. 21 is a schematic showing of still another form of gripper.

For proper understanding of precisely what happens, it is necessary to refer not only to Figs. 1, 5, 6 and 7, but also to Figs. 15 and 16. A conventional square bag, such as bag 200 (Fig. 15), has a front wall 202, a rear wall 204, and gusseted side walls 206. The bottom is closed by turning a portion 208 of the front wall 202 back and securing the portion 208 to the rear wall 204. At the mouth end, the rear wall 204 has a lip 210 which extends beyond the terminus of the front wall 202 and the side walls 206. The bag 200 is a leading bag in the magazine and is engaged at the bottom by fingers 154, at its sides by the fingers 160, while the fingers 172 are vertically adjusted so as to engage only the lip 210 of the rear wall 204. On suction head 100 (Fig. 1) are a plurality of suction cups 100' and the points at which such suction cups will engage the front wall 202 of the bag are similarly indicated in Figs. 15 and 16. The head 100 advances from its retracted position in Fig. 1 until the cups 100' contact and adhere to the wall 202 of the bag. The suction head 100 then moves back toward the front wall 16 of the main frame, drawing with it the front wall 202 of the bag. This slips the bottom 208 and the front wall 202 past the fingers 154 and 160. The fingers 160 then engage the rear wall 204 while the fingers 172 continue in engagement with the lip 210. The net effect is to open the mouth of the bag to the condition illustrated in Fig. 16.

Referring now to Figs. 5, 6 and 7, there is shown mounted at one end of the cross member 162 a member 300. For simplicity of illustration, only one such member is shown, but in practice there will be two such members, one on each side of the magazine. Member 300 is mounted to rock about an axis 302 and a spring 304 tends to hold the member 300 in the horizontal plane as illustrated in Fig. 7. The free end 300' of the member 300 is triangularly shaped. Any downward pressure exerted on the member 300 at any point intermediate the end 300' and the axis 302 will tend to rock the member 300 from its horizontal position in Fig. 7 to a position at right angles thereto.

In Fig. 16 the members 300 are shown in their horizontal position with the open bag mouth just below them. When the bag arrives at this position, the plunger 26 (Fig. 1) begins its descent and its nose 26' encounters the members 300 rocking them about their axes 302 thereby assuring that the side walls 206 of the bag 200 cannot possibly interfere with the descent of the plunger. This makes it possible to have the dimensions of the plunger 26 correspond very closely with the dimensions of the bag body; so closely, that it is virtually impossible for the cross section of the bag body to depart substantially from a rectangle. The importance of this fact will be brought out hereinafter when the action of the plunger at the bottom of the bag is described.

Referring now to Fig. 17, there is shown the completely expanded bottom 212 of the bag 200. One half 214 of the bottom is formed from a portion of the rear wall 204 and the other half 216 is formed from a portion of the front wall 202. There is a transverse fold line 218 in the bag bottom marking the inner extremity of the bottom fold 208. A portion of the side walls 206 at each side of the bottom is folded in to form a triangular ear 220 which lies generally in the plane of the bottom and forms an extension of the side wall 206. Mathematically, the diagonal fold lines indicated as 221 and 221' will always make 45 degrees with each dimension of the bottom. When the bottom is perfectly formed, it lies in a plane at right angles to the front, rear, and side walls, and is sufficiently well defined to form a distinct meeting line such as 223. It is clear that the critical point lies at 224 which represents a meeting of the central line 225 of the ears with the central gusset fold line 226. The co-action of the machine elements thus far described in unique in assuring repeated perfection of the bottom folds. The suction cups 100' on the head 100 exerted a considerable grip on the front wall 202 and offer substantial resistance, not only to direct withdrawal of the bag wall 202 in a direction normal to the cups, but, and especially since the cups are of rubber, they offer substantial resistance to a sliding of the bag wall across the cups in the plane of their active faces. As heretofore described, the plunger 26 is dimensioned so as rather closely to fit the interior of the bag body. This closeness of fit preserves the rectangular configuration of the body which under internal pressure would tend to become oval or circular as indicated by the dotted line 230 in Fig. 17. This in itself is of great assistance in maintaining a proper relationship in the elements of the bag bottom while it is expanded.

The plunger moves quite rapidly and its speed is such that it displaces air as it moves into the bag at a rate such as to produce a substantial static pressure between the nose 26' of the plunger and the bottom of the bag. This static pressure is substantial due to the throttling effect of the relatively small clearance between the walls of the bag and the walls of the plunger. The generation of this static pressure tends to expand the bag bottom to draw it into a plane at right angles to the axis of the bag and to initiate the folds which will ultimately result in the ears 220. In addition and as will presently be described, a jet of air is directed axially of the plunger and emerges through the nose 26'.

In its descent the plunger comes very close to the bottom of the bag before the bag starts to move relative to the suction cups 100'. At the time the bag starts to move with the plunger, the formation of the bottom is nearly complete and the folds have been well initiated by air pressure alone and their location and direction have been controlled by the maintenance as aforesaid of the rectangular cross section. The plunger contacts the bottom of the bag before the bag leaves the suction cups. The bag is carried downward on the nose of the plunger into a carton which has been properly positioned by the conveyor 50 and continued air pressure through the nose 26' serves to strip the bag from the plunger as the plunger ascends. The contact of the plunger nose with the bottom of the carton which is resiliently supported as will hereinafter be described, serves to crease the fold lines of the ears into their final position. When these creases are established the bag bottom is forced to remain in rectangular condition in its proper plane since the diagonal fold lines act as struts or trusses for this purpose.

So far as the proper opening and expansion of the bag bottom is concerned, the fact that the bag is inserted by the plunger into a carton is immaterial, except where a flat bag, as distinct from a square bag, is concerned. In the case of a flat bag, expansion of the bottom would form triangular ears in the plane of the bottom and extending outwardly from the side walls. If such a bag in such condition is then inserted into a closely fitting carton, such ears will automatically be folded upwardly to lie against the side walls.

Referring now to Fig. 13, there is shown a valve 600 having a connection 602 to the sucker head 100 and a connection 604 to the suction side of an air pump 606 (Fig. 14). A member 608 is slidably mounted in a cylinder 610, of the valve 600, which cylinder is intersected by the connections 602 and 604. The member 608 has a beveled edge 612 which seats on a beveled rim 614 in the cylinder 610. With the parts in the position shown in the Figure 13, the beveled edge 612 of the member 608 and the beveled seat 614 of the cylinder 610 have air-tight mutual contact. If the member 608 drops below the position shown in Fig. 13, it exposes openings 616 in the cylinder 610, thus permitting air to be drawn freely through the connection 604, thus preventing the occurrence within the cylinder 610 or in the connection 602 of any substantially subatmospheric pressure. The member 608 has an internal recess 618 in which is seated a spring 620 which bears against the top 622 of the cylinder 610, and tends to maintain the member 608 in its lowermost position with the openings 616 in communication with the connection 604.

The member 608 has mounted in its lower surface a knob 624 which bears on one end 626 of a bell crank or lever 628. The bell crank 628 is pivoted at 630 and, at its opposite end, is connected to a link 632 which in turn is pivoted to the armature 634 of a solenoid 636. When the solenoid 636 is energized, the armature 634 is drawn downwardly, rocking the bell crank 628 and raising the plunger 608 until its beveled edge 612 engages the seat 614 of the cylinder 610. If then the suction cups 100' engage the wall of the leading bag in the magazine, a vacuum is established in the line 602 and in the cylinder 610. This vacuum is sufficient to hold the plunger 608 in its uppermost position against the force of spring 620, even though solenoid 636 is de-energized to drop the end 626 of the lever 628 away from the knob 624 of the plunger 608. If then the plunger 26 removes the bag from the suction cups 100', the vacuum is broken and the spring 620 restores plunger 608 to its lowermost position, thereby clearing the passage between the openings 616 and the connection 604.

Figures 8, 9, 10, 11:
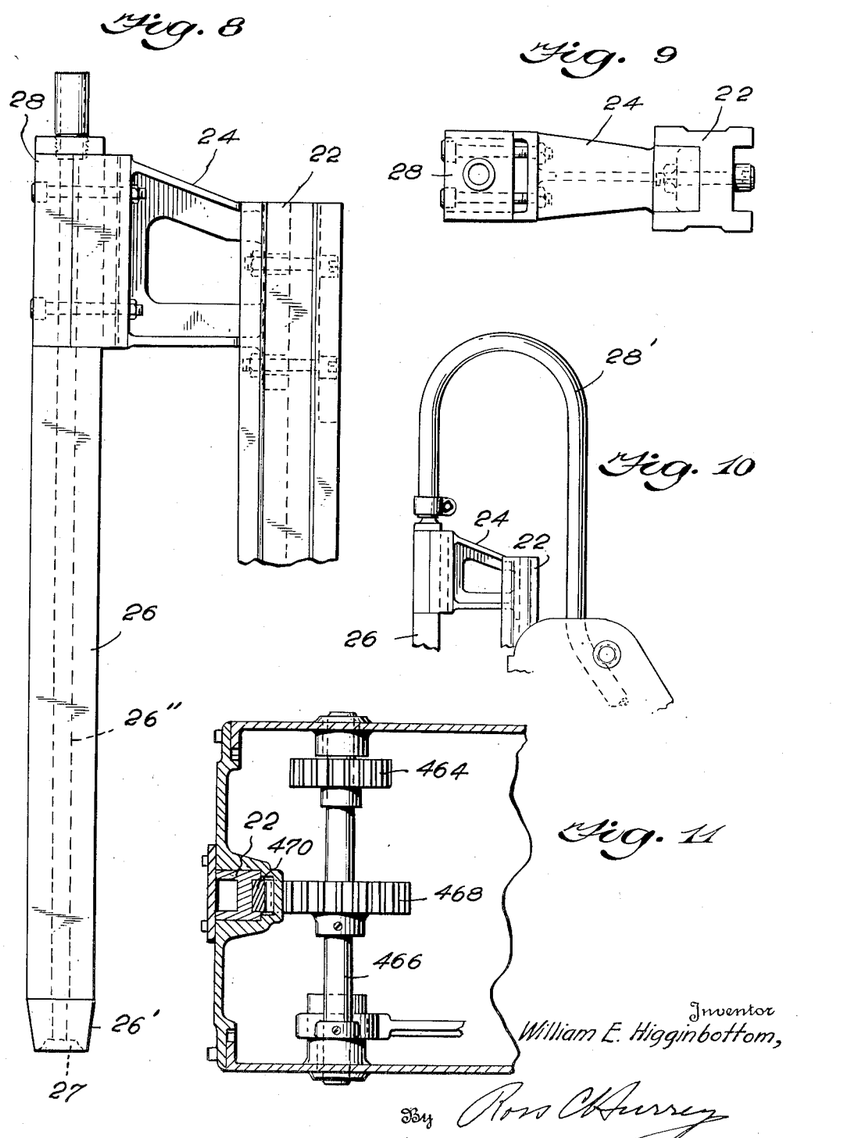
Fig. 8 is an enlarged detail elevation of the plunger.
Fig. 9 is a plan view corresponding to Fig. 8.
Fig. 10 is a detail of the pneumatic connection at the top of the plunger.
Fig. 11 is a section on the line 11—11 of Fig. 1.

Referring now to Figs. 8, 10 and 14, it will be seen that the plunger 26 has a conduit 26" extending its entire length and penetrating its nose 27. A flexible hose 28' connects the conduit 26" to the delivery side 607 of the pump 606. The suction side 607' of the pump 606 has a hose connection 640 joining the pump 606 to the connection 604 of the valve 600, while a flexible hose 101 joins the connection 602 of the valve 600 to the suction cups 100'. The solenoid 636 is connected to a source of electricity 650 through a switch 652. The switch 652 is operated by means of an arm 653 (Figs. 3 and 4) which is interposed adjacent the conveyor 50 to lie in the path of cartons advancing on the conveyor. The switch 652 is closed and the solenoid 636 is energized only when a carton passes the lever 653. This is timed to take place just before the suction head 100 completes its advancing movement toward the bag magazine. On closure of the switch 652, the solenoid 636 is energized, and the valve member 608 is raised to close off the channels 616 and to seat the rim 612 of member 608 as above described. This applies suction to the head 100. During the time that it takes the carton to pass the lever 653, the suction head 100 makes contact with the leading bag in the magazine and the cups 100' adhere firmly to the bag. From this point on, it is no longer necessary to hold the switch 652 closed and, in fact, a moment after the suction cups 100' establish, through contact with the bag, subatmospheric pressure within the valve 610, the carton passes the lever 653, permitting switch 652 to open, and breaking the circuit of the solenoid 636. As previously stated, however, the valve member 608 remains in its upper position under the force of vacuum.

When the suction head has reached approximately its most withdrawn position from the magazine, the plunger 26 begins its descent, enters the now open bag, and upon reaching approximately the bottom of the bag, slides the bag off the suction cups 100'. This breaks the vacuum in valve 610, permitting the valve member 608 to move to its lower-most position under the thrust of spring 620. This opens the passages 616 permitting air freely to be drawn through the pump 606. This free delivery of air moves through the hose 28' to the nose 27 of the plunger 26. The flow starts a moment before the plunger, carrying the bag, strikes the conveyor 50. During this interval, the delivery of air assists in forming the bottom folds of the bag end, as the plunger starts to rise, the air delivered through the hose 28 and the conduit 26" strips the bag from the plunger, permitting the bag to remain within the carton. If desired, an accumulator can be placed in the line of the hose 28' so that a substantial pressure and a substantial supply of air can be built up during the period when the valve member 608 is at its lowermost position and the channels 616 are open. In such case a valve is provided between the accumulator and the plunger 26, and is made responsive to the descent of the plunger. As a rule, this will only be necessary when relatively large bags are handled, or when the material of the bags is porous.

The arrangement of valve, solenoid and pump, above described, has, as its primary function, prevention of the removal of the bag from the magazine, unless a carton is on the conveyor and ready to receive the bag. A collateral function, however, is to provide maximum delivery of air through the plunger 26 at the time when it is most needed, that is, just before the plunger strikes the conveyor and while the plunger is being withdrawn.

The drive by which the various elements heretofore described are operated may best be understood by reference to Figs. 1, 2, 3, 4, 11 and 12. A motor 400 drives the main shaft 402 through a pulley and belt arrangement 404. A pinion 406 on shaft 402 meshes with a gear 408 on a counter shaft 410. A pinion 412 on the counter shaft 410 meshes with a gear 414 on a cam shaft 416. The gear 414 is connected to the shaft 416 by means of a one-revolution clutch 418, and is operative to drive the shaft 416 only when a pin 420 is disengaged from a lug 418' on the clutch 418. This pin is under the control of a hand lever 422, which affords a means of disengaging the motor from the cam shaft, but which always brings the parts to rest in a position predetermined by the location of the lug 418' relative to the reciprocating mechanisms.

A pair of cams 424 and 426 are keyed to the cam shaft 416. The cam 424 controls the suction head 100, while the cam 426 operates in plunger 26. A bell crank 428 is pivoted to the frame at 430 and has at one end a follower 432 engaging a groove in the cam 424. At its opposite end, the bell crank 428 is connected to a rod 434 which is pivoted at 436 to a bracket 438 to which the rods 102, which carry the suction head 100, are mounted. A spring 440 relieves the rearward movement of the bell crank 428. This permits the use of adjustable stops to limit rearward movement of the suction head 100. A collar 442 is mounted on the rod 434 to receive the forward thrust of the bell crank 428. Adjustment of the collar 442 on the rod 434 provides a means for determining the extent of the forward advance of the suction head 100. A lever 450 is pivoted to the frame at 452 and, at a point intermediate its extremity, has a follower 454 which bears in a groove in the cam 426. At its free end, lever 450 has a gear segment 456 which meshes with a pinion 458 on a shaft 460. A gear 462 is also secured to the shaft 460 and meshes with a pinion 464 on a shaft 466. A gear 468 is also secured to the shaft 466 and meshes with a rack 470 secured to the elevator 22. As the lever 450 is rocked by the cam 426 and the follower 454, it oscillates first shaft 460, then shaft 466, and thereby raises and lowers the elevator 22 and the plunger 26. The shafts 460 and 466 with the gear 462 and the pinion 464 provide through substitutions of the gear and pinion, means for adjusting the stroke of the plunger 26.

A sprocket 472 is keyed to the shaft 402 and drives the pump 606 through a chain 474 and a sprocket 476.

Figure 3:
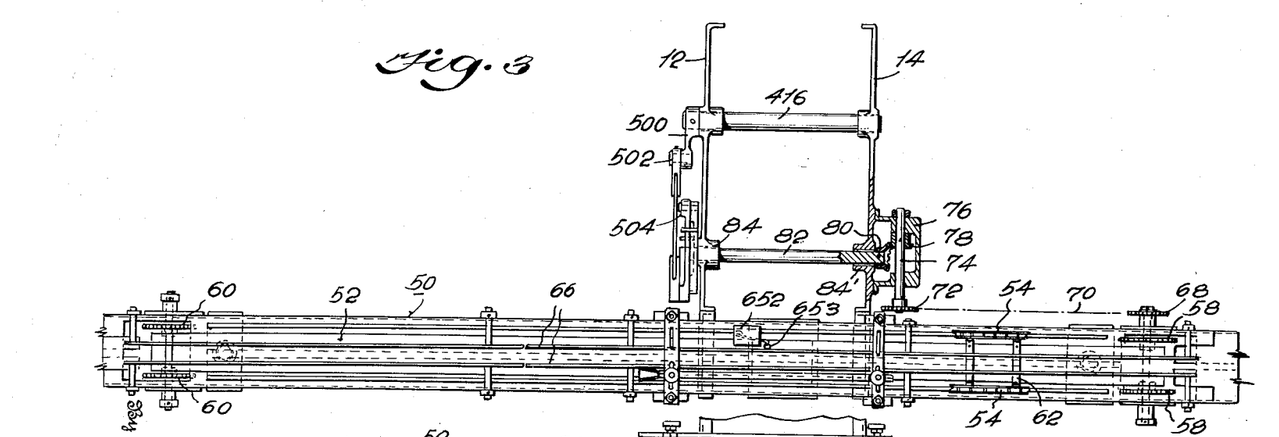
Fig. 3 is a plan view of the conveyor.
Figure 4:
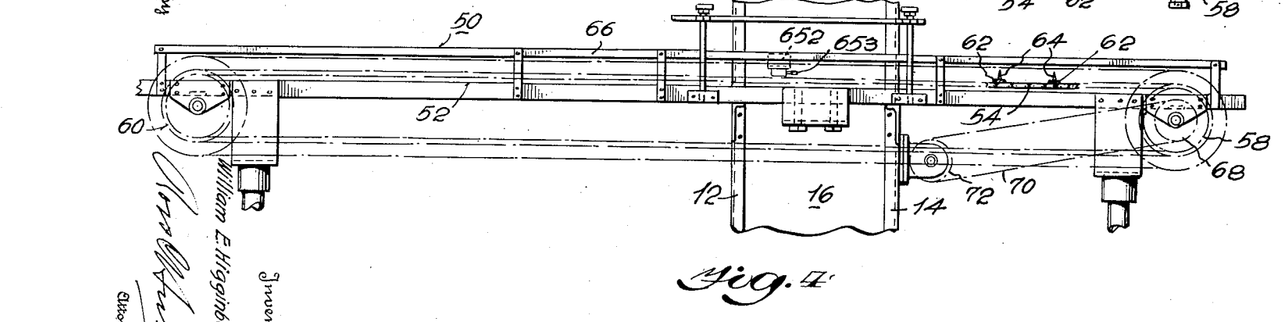
Fig. 4 is a front elevation of the conveyor.

One end of the shaft 416 extends through the side frame 12 and has mounted thereon an arm 500 (Figs. 3 and 12). The arm 500 is pivoted at 502 to one end of a connecting rod 504, the opposite end of which is pivoted at 506 to a lever 508 which is rotatably mounted at 510 on the shaft 82. A disc 512 is keyed to the shaft 82 and has in its periphery equally spaced notches 514. At the opposite end of the lever 508 is pivotally mounted a pawl 516. As the lever 500 rotates with the shaft 416, the lever 508 is oscillated about the shaft 82 by the connecting rod 504. During the forward oscillatory movement, the pawl 516 engages one of the notches 514 in the disc 512, thereby advancing, through a predetermined number of degrees, the shaft 82, which as heretofore noted, advances the conveyor 50. It will be seen, therefore, that there is one advancing movement of the conveyor 50 for each rotation of the shaft 416, just as there is also one lowering and raising of the plunger 26, and one advance and retreat of the suction head 100, for the same revolution of shaft 416. The shaft 82, and accordingly the conveyor 50, are, however, idle during more than one-half of each revolution of the shaft 416 to permit the cartons on the conveyor to remain stationary while the plunger 26 inserts a bag into the carton below it at the time.

It would require micrometric adjustment, which would be both expensive to provide and time consuming to operate, to assure that the nose 26' of the plunger 26 would never forcibly encounter the bottom of the carton resting on the conveyor. As a practical matter, therefore, means are provided for yielding to the shock of the encounter of the plunger 26 with the conveyor 50. This mechanism is best shown in Figs. 1 and 2 and comprises a pair of rods 700 mounted in bosses 702 in the base 10. At their upper ends, the rods 700 are secured in bosses 704 formed on the guide 20 for the elevator 22. A pair of cross members 706 are slidably mounted on the rods 700 and are rigidly secured to a U-shaped member 708 which lies below the elevator 22 and between the rods 700. A rubber or other resilient pad 710 cushions the bottom of the U-shaped member 708 against the impact of the elevator 22. Compression springs 712 surround the rods 700 below the lowermost of the cross members 706 to afford resilient support for the member 708. The actual energy of the plunger and elevator are absorbed by this structure and it is only necessary to provide below the belt of the conveyor 50 in the area of impact of the plunger 26, a yielding plate to accommodate the movement of the plunger. This need only be lightly sprung since the inertia load is taken up by the springs 712.

Figure 18:
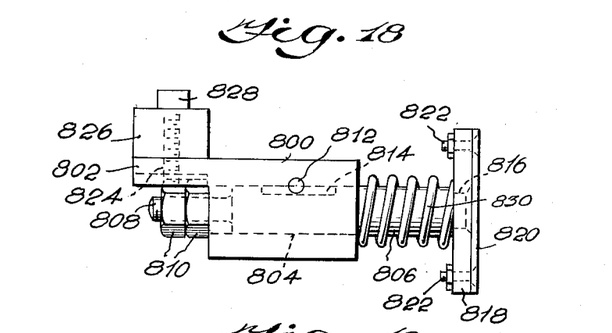
Fig. 18 is a side elevation of a supplementary gripping means.
Figure 19:
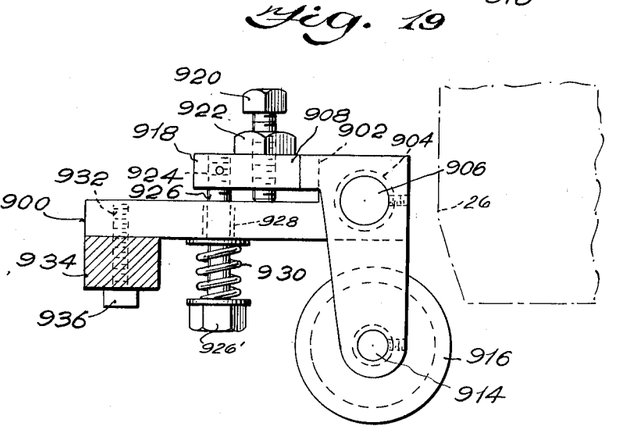
Figs. 19 and 20 are respectively elevation and plan view of an alternative gripper.
Figure 20:
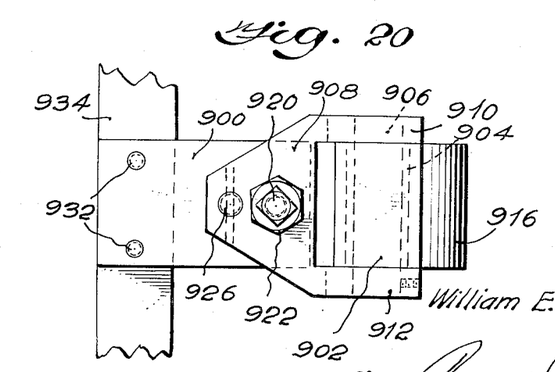

In case it is desired to use the machine merely as a means for opening the bags and squaring up bag bottoms without inserting the same into cartons or in any case where the material of the bag is relatively stiff, it is desirable to supplement the coaction of the plunger with the grip of the suction cups 100' by the use of certain supplementary means best shown in Figs. 18, 19 and 20, and best understood by reference to said figures in conjunction with Figs. 5, 6 and 7.

As heretofore described, when the plunger 26 approaches the open mouth of the bag, the front wall of which is gripped by suction cups 100' and the rear wall of which is gripped by fingers 154, 160 and 172 (Fig. 16), it strikes the members 300' (Fig. 7) turning them through 90 degrees from their normal horizontal position to a vertical position, and in so moving, the members 300', square up the mouth of the bag and serve as a guiding means to prevent any engagement of the nose of the plunger 26 with the gusseted side walls of the bag. In the case of small bags formed of relatively flexible material such as glassine or cellophane, the grip of the suction cups 100' is sufficient to hold the bag in position until the plunger 26 so nearly reaches the bottom of the bag as to complete the bottom folds illustrated in Fig. 17. The descent of the plunger then slides the bag past the suction cups 100' and releases the bag from the grip of the cups. Where the material is relatively stiff, such for example, as certain laminated glassines and certain paper and foil laminations, the resistance offered by the suction cups 100' may not be sufficient to enable the plunger 26 firmly to define the requisite areas at the bottom of the bag before pulling the bag away from the suction cups 100'. To meet this condition, the present invention contemplates the use of auxiliary pressure members which frictionally engage the outer surface of the side walls, pressing these walls against the side walls of the plunger. The coefficient of friction of these pressure members with respect to the material of the bag is greater than the coefficient of friction between the material of the bag and the material of the plunger or of the members 300, so that despite the applied pressure, there is no substantial wear of the inner surface of the bag walls.

As shown in Fig. 18, there is provided a member 800 of rectangular cross section and having a reduced rearwardly extending flange 802. A cylindrical bore 804 extends lengthwise of the member 800 and receives a cylindrical stud 806. At the rearward end of the stud 806 is a reduced threaded portion 808 on which are mounted lock nuts 810. The body portion 800 is drilled transversely at 812 and a portion of the body of the stud 806 is cut away at 814. A pin passes through the hole 812 and serves to lock the stud 806 against turning movement and also to limit axial movement of the stud in the bore 804. The forward end of the stud 806 is reduced at 816 and passes through the center of a rectangular plate 818. The end 816 of the stud 806 is riveted into a countersink in the plate 818. A disc 820 of rubber or other high friction material is secured to the outer face of the plate 818 by means of screws and nuts 822. The flange is drilled and tapped at 824 so that the member 800 may be secured to a support 826 by means of cap screws 828. The support 826 is screwed by any suitable means to the vertical angles 156 (Figs. 5 and 7). A spring 830 encircles the forward end of the stud 806 and contacts the body portion 800 and the plate 818, tending to thrust the stud 806 forwardly. The forward movement is limited by the lock nuts 810 which also serve to adjust the tension of the spring 830.

Two such members are provided, one for each side of the bag and are positioned to engage the bag preferably above the extremities 300' of the members 300 when the same have entered the bag.

An alternate structure is illustrated in Figs. 19 and 20 and comprises a member 900 having a boss 902 formed at its forward end. The boss 902 is drilled at 904 for the reception of a stud 906. A bell crank 908 is bifurcated to form arms 910 and 912. These arms are fulcrumed on the stud 906 and at their free ends have mounted a stud 914 on which a roller 916 is rotatably mounted. The opposite end 918 of the bell crank 908 is drilled and tapped for the reception of a cap screw 920 bearing a lock nut 922. The cap screw 920 penetrates the end 918 of the bell crank 908 and bears against the member 900. At the extremity of the end 918 there is a tapped hole 924 which receives a cap screw 926. The cap screw 926 penetrates a bore 928 in the member 900 and a spring 930 encircles the cap screw 926 and bears against the head 926' of the cap screw 926 and against a washer which in turn bears against the member 900. The spring 930 tends to hold the nose of the cap screw 920 against the member 900 and therefore to limit the forward swinging of the roller 916 about the stud 906. The outer end of the member 900 is drilled and tapped at 932 to enable the assembly to be secured to a support 934 by means of cap screws 936. The support 934 is secured by any suitable means to the angles 156 shown in Figs. 5 and 7.

The mounting of the roller 916 is such that any turning of the roller on the stud 914 is subject to strong frictional resistance and the roller 916 has its cylindrical surface covered with rubber or other suitable high friction material. The resistance to turning of the roller 916 on the stud 914 is adjusted to a point at which the roller will rotate before the limit of strength of the bag wall is reached, or before the bottom can be destroyed by downward movement of the plunger 26. The roller thus affords a safety factor which will prevent destruction of the bag even though, by adjustment of the cap screw 920 and the spring 930, an excess of pressure is brought about between the roller 916 and the bag wall.

In addition to or as an alternative for the expedients illustrated in Figs. 18, 19 and 20, resort may be had to the device illustrated in Fig. 21. Where the friction plate or roll shown in Figs. 18, 19 and 20 is replaced by a pair of suction cups 952 mounted on a pair of supporting members 950 and each connected by means of conduits 954 with the branch 602 of the valve 600. This arrangement applies suction to the cups 952 simultaneously with the application of suction to the cups 100' of the reciprocating head 100 and breaks suction to the cups 952 simultaneously with the breaking of suction to the cups 100'. The particular advantage of this expedient is that it does not involve the generation of friction by pressure applied against the plunger 26 through the walls of the bag 956. Instead, the side walls of the bag 956 are drawn outwardly and away from the walls of the plunger 26 thereby completely avoiding any rubbing or scuffing of the interior surface of the bag walls.

The claims hereafter set forth are directed not only to the combination of a carton advancing conveyor, a bag magazine, suction head and plunger, but are also devoted to sub-combinations of the plunger and bag opening means, and to the plunger, the bag opening means, and the suction control valve. These subsidiary combinations have distinct utility and it is anticipated that the subject matter of such sub-combinations will be independently incorporated in various types of machines quite apart from a carton delivering conveyor. Unless otherwise specified in the claims, any reference to bags shall include flat and square bags, and flat or gusseted tubes.

What is claimed is:

1. A method of expanding gusseted bags of the square type from flattened condition comprising: opening the mouth of the bag and thereafter progressively expanding the body of the bag toward the bottom while restraining the bag walls in mutually rectangular relationship, initiating the bottom fold lines by pneumatic pressure exerted concomitantly with the progressive expansion of the bag body and then creasing by positive compression, the fold lines thus initiated.

2. A machine of the class described comprising: a magazine for holding a quantity of bags; means for moving the outermost wall of the leading bag in the magazine; means restraining the opposite wall of said bag against movement whereby to open the bag mouth; means entering said opened mouth and operative to remove the bag from said wall moving and wall restraining means; and guide means entering said bag mouth simultaneously with said bag entering means, said guide means entering adjacent the side walls between the leading and trailing walls and being operative to assure rectangular configuration of the open bag mouth.

3. A machine of the class described comprising: a magazine for holding a quantity of bags; means for moving the outermost wall of the leading bag in the magazine; means restraining the opposite wall of said bag against movement whereby to open the bag mouth; means entering said opened mouth and operative to remove the bag from said wall moving and wall restraining means; and guide means entering said bag mouth simultaneously with said bag entering means, said guide means entering adjacent the side walls between the leading and trailing walls and being operative to assure rectangular configuration of the open bag mouth, said guide means normally lying in the path of said bag entering means and being operated thereby.

4. A machine of the class described comprising: a bag magazine; a suction head for opening consecutive bags thereon; a plunger for entering the bags removed by said suction head to expand the bags and carry them below said suction head; a conveyor for presenting cartons consecutively to a position below and aligned with said plunger to receive bags delivered thereby; a pump having its suction side connected to said suction head; a valve in the suction line of said pump and means responsive to the absence of a carton at said position for operating said valve to disable said suction head.

5. A machine of the class described comprising: a bag magazine; a suction head for opening consecutive bags thereon; a plunger for entering the bags removed by said suction head to expand the bags and carry them below said suction head; a conveyor for presenting cartons consecutively to a position below and aligned with said plunger to receive bags delivered thereby; a pump having a suction line connected to said suction head and a delivery line connected to said plunger; a valve in said suction line;

means responsive to the absence of a carton at said position for operating said valve to disable said suction head; and means responsive to the removal of a bag from said suction head for connecting said suction line to the atmosphere whereby to deliver air to said plunger for stripping a bag therefrom.

6. A machine of the class described comprising; means for opening the mouth of a bag; a plunger; means for inserting said plunger into said open bag mouth; and means operating at right angles to said bag opening means for gripping frictionally two opposed walls of the bag against the plunger as the plunger enters the bag.

7. A machine of the class described comprising: means for opening the mouth of the bag; a plunger; means for inserting said plunger into said open bag mouth; and means operating at right angles to said bag opening means for gripping two opposed walls of the bag to hold the same against the plunger as the plunger enters the bag.

WILLIAM E. HIGGINBOTTOM.

REFERENCES CITED

The following references are of record in the file of this patent:

UNITED STATES PATENTS

| Number | Name | Date |
|---|---|---|
| 954,739 | Joplin | Apr. 12, 1910 |
| 1,001,268 | Heybach | Aug. 22, 1911 |
| 1,527,030 | Delamere et al. | Feb. 17, 1925 |
| 1,943,770 | Morey | Jan. 16, 1934 |
| 2,106,463 | Long | Jan. 25, 1938 |
| 2,299,699 | Hultkraus | Oct. 20, 1942 |
| 2,342,219 | Price | Feb. 22, 1944 |
| 2,357,527 | Lundquist | Sept. 5, 1944 |
| 2,428,192 | Berch | Sept. 30, 1947 |